United States Patent [19]
Edelstein et al.

[11] Patent Number: 5,834,057
[45] Date of Patent: Nov. 10, 1998

[54] METHOD OF MAKING CHEMICALLY ENGINEERED METASTABLE ALLOYS AND MULTIPLE COMPONENTS NANOPARTICLES

[75] Inventors: Alan S. Edelstein, Alexandria, Va.; Vincent G. Harris, Laurel, Md.

[73] Assignee: The United States is represented by the Secretary of the Navy, Washington, D.C.

[21] Appl. No.: 672,772

[22] Filed: Jun. 28, 1996

[51] Int. Cl.⁶ .................................. B05D 7/00; B05D 3/02
[52] U.S. Cl. ................... 427/212; 427/377.2; 427/376.2; 264/11
[58] Field of Search .................. 427/212, 372.2, 427/376.2, 419.2; 264/11

[56] References Cited

U.S. PATENT DOCUMENTS

| | | | |
|---|---|---|---|
| 5,352,269 | 10/1994 | McCandlish et al. | 75/351 |
| 5,456,986 | 10/1995 | Majetich et al. | 428/403 |
| 5,468,427 | 11/1995 | Stangle et al. | 264/3.4 |
| 5,470,373 | 11/1995 | Edelstein et al. | 75/255 |
| 5,639,318 | 6/1997 | Edelstein et al. | 148/513 |

*Primary Examiner*—Shrive Beck
*Assistant Examiner*—Bret Chen
*Attorney, Agent, or Firm*—Thomas McDonnel; Barry Edelberg

[57] ABSTRACT

Nanoparticles of a mixed oxide precursor are reduced to form particles of a nanostructured metastable alloy having a majority metal and a minority metal. Additional heating enriches the surfaces of the particles with respect to the minority metal, thus forming a coating on the particle core. This coating has a higher atomic ratio of minority to majority metal than found in the precursor. The nanostructured metastable alloys may then be oxidized to form nanoparticles having a coating of the oxide of the minority metal and a core of the majority metal or an oxide of the majority metal. The majority metal may be, for example, copper. The minority metal may be, for example, cobalt.

5 Claims, 5 Drawing Sheets

METHOD OF MAKING CHEMICALLY ENGINEERED METASTABLE ALLOYS AND MULTIPLE COMPONENTS NANOPARTICLES

This application claims the benefit of the filing date of the copending application filed May 31, 1996, U.S. Ser. No. 08/655,770, by Edelstein et al.

BACKGROUND OF THE INVENTION

1. Field of the Invention

The present invention relates generally to nanoparticle technology and more specifically to the formation of alloys having a nanoparticle structure.

2. Description of the Background Art

Nanostructured materials are usually defined as materials having particle sizes of 100 nm or less. Because of their favorable magnetic properties, nanostructured materials are used in magnetic storage devices and applications and other magnetic components. The high reactivity of nanoparticles also favors their use as catalysts. However, the high reactivity of nanoparticles also complicates their use for other applications that require chemical and structural stability.

Additionally, it is desirable for electronic interconnects to be both conducting and oxidation-resistant. Structures that favor oxidation of an outer passivating layer tend to preserve their intrinsic properties after exposure to an oxidizing environment. An appropriate nanostructured metal system which provides both high electrical conductivity and oxidation-resistance would be very useful.

Because of their high reactivities, nanoparticles of oxidizable metals may quickly develop a surface oxide film. This oxide surface film can interfere with the desirable electronic, magnetic, and catalytic properties of the nanostructured material.

One approach to preventing surface oxidation of nanostructured metals is to protect the electrically, magnetically, or catalytically active, but highly oxidizable metal with a second metal that is less readily oxidized than the first metal. Nanostructured materials of this type may be made, for example, by co-sputtering of the two metals.

To realize benefits from such a method, the two metals must be well-mixed. Non-mixed nanoparticles will usually react separately with respect to each other. Therefore, many desirable nanostructured materials are stable or metastable structures. In addition to co-sputtering, metastable nanostructured alloys have been made by ball milling and other rapid quenching techniques.

Unfortunately, these prior art processes produce only small quantities of materials, introduce impurities, and/or form only highly strained nanoparticles. Highly strained nanoparticles, such as those produced by ball-milling, are difficult to compact to a high density.

Additionally, structure and particle size strongly influence the magnitude of the giant magnetoresistive effect in granular materials systems. Therefore, it is highly desirable to control the microstructure of nanostructured materials.

SUMMARY OF THE INVENTION

Accordingly, it is an object of this invention to produce metastable, nanostructured alloys.

It is another object of the present invention to produce metastable, nanostructured alloys that are essentially free of strain.

It is a further object of the present invention to provide metastable, nanostructured alloys that may be readily compacted to a high density.

These and additional objects of the invention are accomplished by reducing atomically mixed metal oxide nanoparticles of at least two metals. Other microstructures, e.g., granular phase-separated structures, may be formed by additional heating.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

In FIG. 1($a$) through FIG. 1($e$), "OA" is the oxide of metal A; "OB" is the oxide of metal B; "OAB" is the atomically mixed oxide of metals A and B; "MA" is metal A; "MB" is metal B; and MAB is an alloy of metals A and B in which metal B is the minority constituent.

DESCRIPTION OF THE PREFERRED EMBODIMENTS

Figure 1A:
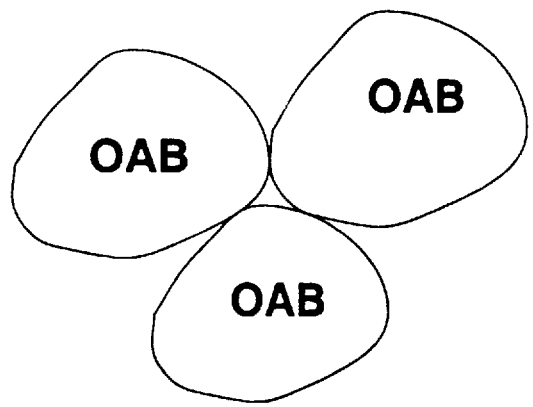
FIGS. 1($a$), FIG. 1($b$), FIG. 1($c$), FIG. 1($d$), and FIG. 1($e$) show the structures of nanostructured materials produced by the initial reduction of mixed oxide precursors.
Figure 1B:
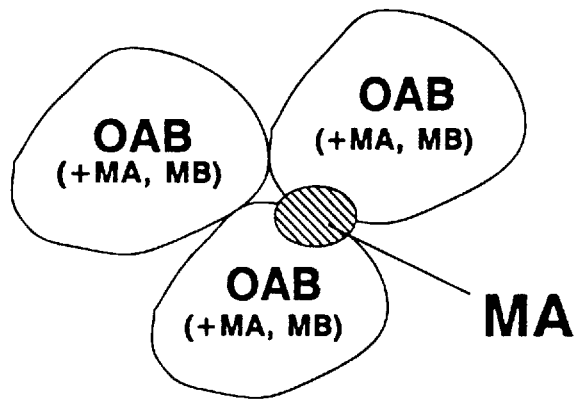

According to the present invention, nanostructured materials are made by reducing an atomically mixed precursor oxide that includes the metals to be alloyed. As used herein, an "atomically mixed" oxide is a thermodynamically stable mixture. The formation of an atomically mixed oxide precursor requires that the metals to be alloyed are either similar in size or valence or that the precursor oxides have different sites that accept metal atoms with different valences and/or sizes.

Various immiscible combinations of metals may be alloyed according to the present invention. Typically, the metal alloyed according to the present invention are transitions metals. More often, the metals to be alloyed are copper, nickel, and cobalt. Most often, the present invention is used to produce a CuCo nanostructured alloy.

The nanostructured materials should contain each metal in an amount greater than its solubility limit in the alloy, but in a concentration that allows the formation of a metastable alloy. For example, a nanostructured CuCo alloy according to the present invention typically includes from about 1 atomic percent to about 40 atomic percent cobalt. More often, the nanostructured alloy includes from about 10 atomic percent to about 40 atomic percent cobalt. In the method used by the present invention, CuCo mixtures having greater than about 40 atomic Co form phase separated mixtures rather than metastable alloys. Other combinations of metals may have different upper and lower limits on the amount of each metal, depending upon the miscibilities of the metals of the combinations.

The mixed oxide precursor may be made, for example, by reducing a precipitated mixture of the metal hydroxides. Metal hydroxides are typically formed by adding a base to a solution of a metal salt. Typically, the metal salt is a nitrate or a halide, such as a chloide. Generally, the base added to the metal salt solution is an alkali metal hydroxide, for example NaOH or KOH. The resulting mixed metal hydroxide precipitates are then separated from the solution, for example by filtering, and washed if needed. The resulting hydroxides will typically be in the form of a loose agglomerate, with an average particle size of about one micron or less. Generally, in these loose agglomerates, the largest particle is 10 microns or less in diameter. Within each particle, the mixed hydroxide crystallites are typically about 10–30 nm, with the largest crystallites typically being about one micron or less in diameter. These small particle sizes for the agglomerates and crystallites of the precursor compounds may contribute to the ability of the present invention to provide a nanostructured alloy product.

The mixed metal hydroxide crystallites are then reduced at a temperature and time below that at which phase separation occurs. The exact temperatures and times employed depend upon the combination of metals selected and the particle size distribution of the precursors. To produce nanostructured CuCo, for example, the mixed hydroxides should be reduced, under flowing hydrogen for example, by heating at temperatures below about 333° C. for more than about 10 minutes and less than about one hour. At 333° C., phase separation begins to occur. Typically, for about one hour, mixed Cu and Co oxides are heated at temperatures of about 215° C. to about 300° C. and most often at about 215° to about 265° C.

Initially, the heat/flowing $H_2$ treatment (usually for about one hour) reduces the mixed hydroxide precipitate to a mixed oxide precursor of the metastable alloy. Continuation of the heat/flowing $H_2$ treatment further reduces the mixed oxide precursor to the elemental metals, thus forming a metastable, nanostructured, mixed alloy.

The formation of the metastable alloy according to the present invention is aided by the atomically mixed nature of the precursors for that alloy. This atomic mixing is accomplished by using precipitated precursors that are miscible with each other. If the initially precipitated precursor is an hydroxide, then both the hydroxides and the oxides of the metals should be miscible with each other. If only the hydroxides of the metals are miscible with each other, phase separation may occur during the initial reduction hydroxide to the oxide form, and a metastable, nanostructured alloy would not be formed.

Metal hydroxides, when precipitated from solution as described above, typically form a loose agglomerate having an average particle size of about 1 micron. The individual crystallites of the agglomerated hydroxide, however, often have a much smaller particle size, such as about 10 to about 30 nm. The nanometer scale of these crystallites is retained when the particles are reduced according to the method of the present invention. Upon re-oxidation, the reduced nanoparticles retain nanoscale dimensions.

The metastable nanostructured alloy according to the present invention is a supersaturated, nanocrystalline, non-uniform solid state solution. Once formed, the nanostructured alloy may be further heated, resulting in phase separation. In alloys of two metals, this phase separation produces particles in which the minority metal at least partially coats a core of the majority metal or a phase rich in the majority metal. Upon exposure to oxygen, the outer coating oxidizes first. Thus, one may oxidize only the outer coating of the particle, producing a core of the majority metal (or a majority metal-rich phase) in elemental form at least partially coated by oxidized minority metal. Alternatively, one may start oxidizing the entire phase separated structure by exposure to air at room temperature for about two weeks. The oxidation is about 50% after several weeks. Eventually, the entire sample oxidizes. Alternatively, exposure in air at 400°C. for 15 minutes causes substantial oxidation of the majority metal.

As shown in FIG. 1(a) through FIG. 1(e), nanoparticles of the starting mixed oxide OAB (FIG. 1(a)) (generally formed in situ from a hydroxide precipitate) are reduced, by heat and flowing hydrogen for example. The majority metal, being more prevalent, starts to nucleate crystals at the surfaces and interfaces between the nanoparticles. This nucleation and crystallization leaves behind a mixture of OAB and MB that is increasingly rich in OB and MB (FIG. 1(b)). As reduction, crystallization, and segregation continue, MB becomes incorporated into the newly developing structure as an outer shell enriched in (typically an enrichment of 20% or greater relative to the minority/majority ratio in the precursor(s), more often an enrichment of about 40% or greater relative to the minority/majority ratio in the precursor(s); in some cases an enrichment of 100% or more relative to the minority/majority ratio in the precursor(s) occurs) MB (FIG. 1(c)). Further annealing of the material having the structure shown in FIG. 1(c) results in further phase separation. The MA atoms diffuse out of the surface shell into the core and separate crystal of MB form on the surface of the MA core. As a result, the new surface crystals of MB ball up on the surface, providing the structure shown in FIG. 1(d). If the lattice mismatch between metal A and metal B is sufficiently great, the structure shown in FIG. 1(c) may be bypassed and the material will instead directly develop the structure shown in FIG. 1 (d). Exposure of the material having the structure shown in FIG. 1(d) to oxygen causes the MB atoms to oxidzie before the core MA atoms, resulting in the FIG. 1(e) structure. After further oxidation, the core MA atoms of the material having the FIG. 1(e) structure also oxidize.

Having described the invention, the following examples are given to illustrate specific applications of the invention including the best mode now known to perform the invention. These specific examples are not intended to limit the scope of the invention described in this application.

EXAMPLES

Nanocrystalline material was prepared by first adding NaOH to an aqueous solution containing the appropriate amounts of Cu (II) and Co (II) chloride or nitrate. Chloride salts were used initially but the later work was performed using nitrates, lower concentrations, and more thorough washing to remove residual salt. The oxidation results are qualitatively independent of which salt is used. The resulting Cu- and Co-hydroxide(s) precipitate was rinsed in distilled, deionized water, dried at room temperature and then annealed in flowing hydrogen gas (25 ml/min) and, in later work, ground in mortar and pestle and sieved to –325 mesh. At sufficiently long annealing times and/or high enough temperatures, the hydroxides are first transformed to oxides and then reduced to metals.

Figure 2:
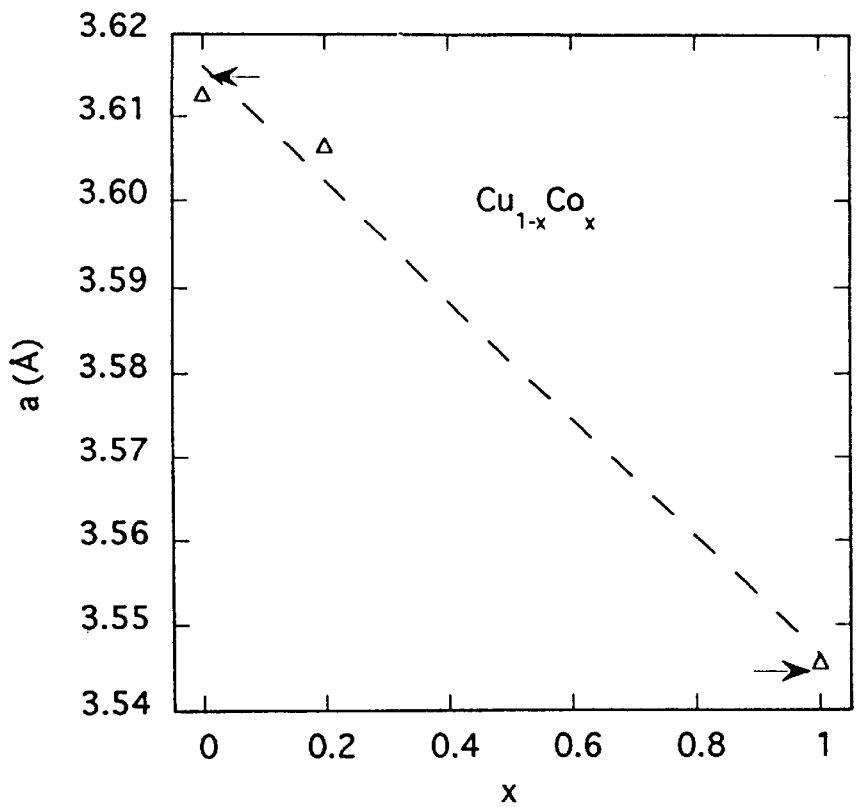
FIG. 2 shows a plot of the lattice constant of $Cu_{1-x}Co_x$ determined by x-ray diffraction vs. x. The arrows represent the lattice constant of bulk Cu and Co.
Figure 3:
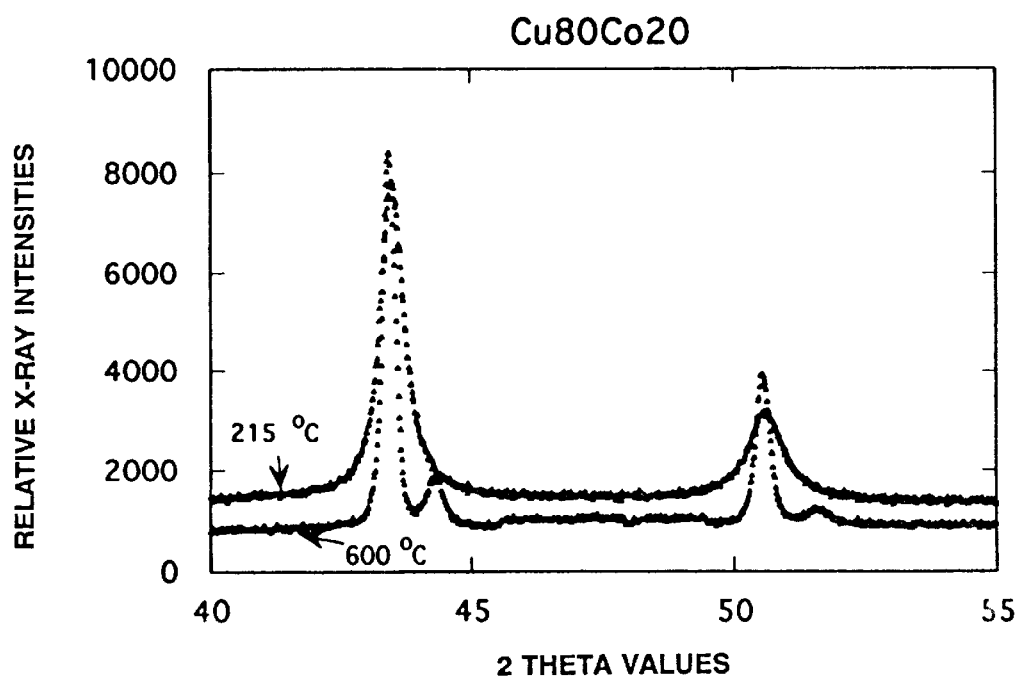
FIG. 3 shows the x-ray spectrum of a sample heat treated at 215° C. (bottom trace) and latter at 600° C.

FIG. 2 shows a plot of the lattice constant of $Cu_{1-x}Co_x$ determined by x-ray diffraction (as described below with reference to FIG. 3) vs. x. The arrows represent the lattice constant of bulk Cu and Co. In many situations, the lattice constant of an alloy is an approximately linear function of the concentration. This behavior is described as Vegard's law. As shown in FIG. 2, the $Cu_{80}Co_{20}$ sample produced from hydrogen has the value expected from Vegard's law. This result provides strong evidence that the processing route according to the present invention has led to the formation of an inhomogeneous metastable $Cu_{80}Co_{20}$ alloy.

Figure 1C:
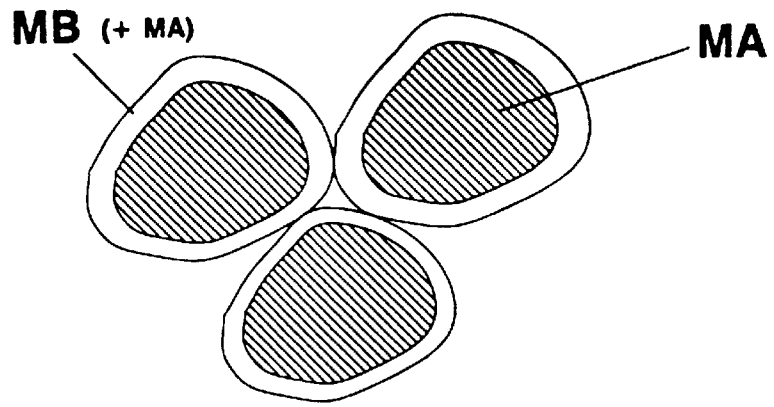

In the FIG. 1(c) material, each particle has an inner core of copper or copper enriched material and is coated with an outer layer of cobalt that forms a coherent interface with the copper-enriched core. Because of this coherent interface, the nanostructured phase formed of shown in FIG. 1(c) is defined in the present specification and the appended claims as single phase material.

Figure 1D:
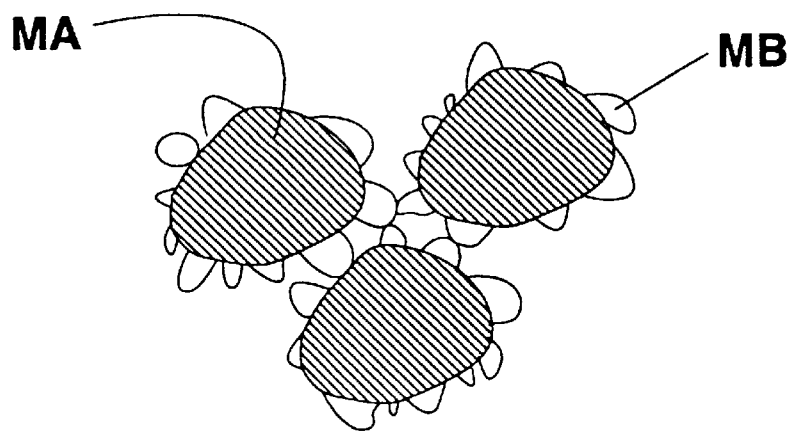
Figure 4:
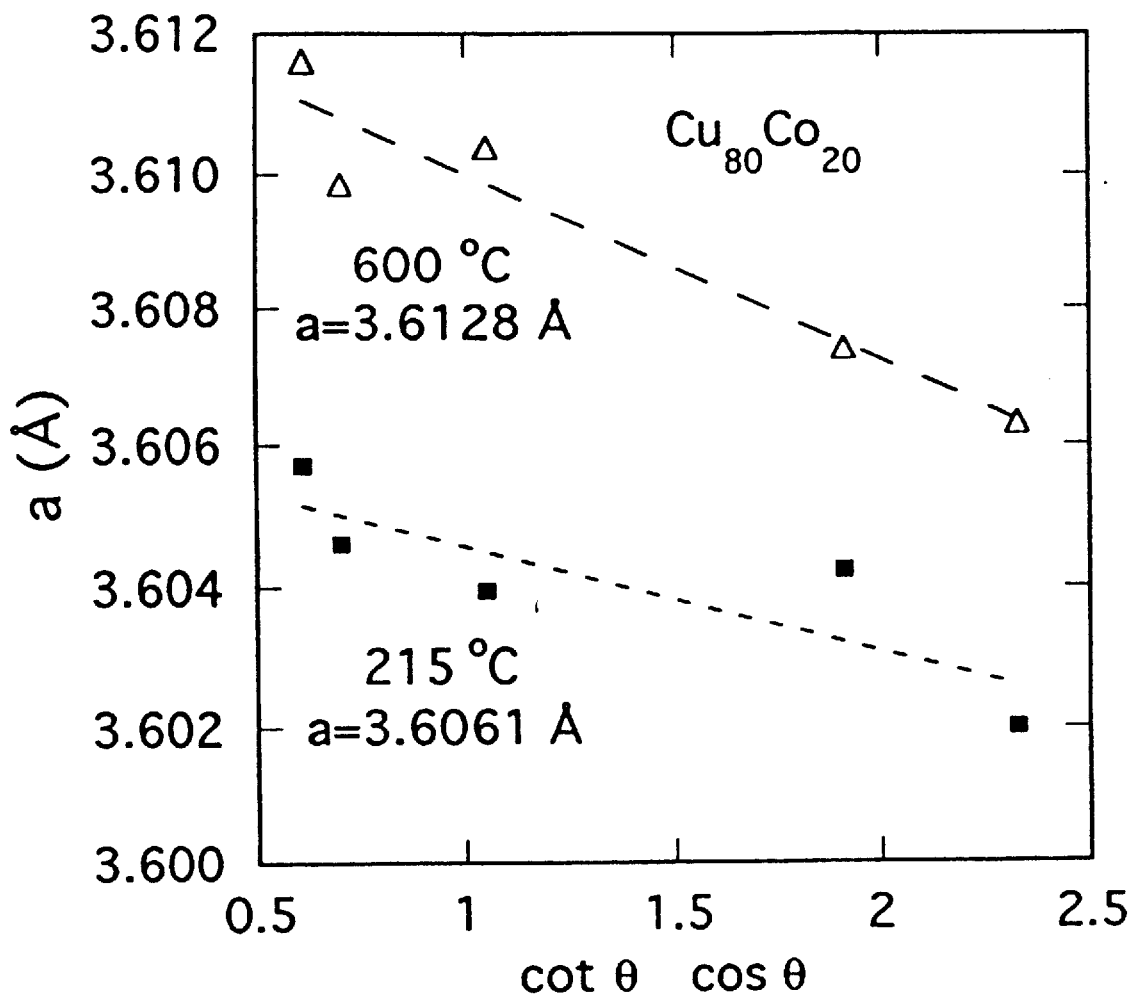
FIG. 4 shows a plot of the lattice constants calculated from the position of the diffraction peaks as a function Cot θ Cos θ for an alloy sample heat treated at 215° C. and the Cu peak of a phase-seperated sample heat treated at 600° C.

If the reduction is performed at higher temperatures, then the material (having the structure shown in FIG. 1 (c), where metal A is copper and metal B is cobalt) phase-separates into the material having the structure shown in FIG. 1(d), where the outer coating of cobalt forms an incoherent interface with the inner copper or copper-enriched core. Evidence for phase separation in FIG. 1(d) materials is that each of the peaks shown in the x-ray spectrum of the alloy heat-treated at 215° C. of FIG. 3 (upper trace) splits into two peaks in the case of heat treatment at 600° C. (lower trace). The lower angle member of each pair is an fcc Cu diffraction peak and the higher angle member is an fcc Co diffraction peak. FIG. 4 shows a plot of the lattice constants calculated from the positions of the diffraction peaks as a function Cot θ Cos θ for an alloy sample heat treated at 215° C. and a phase-separated sample heat treated at 600° C. The extrapolations of the 215° C. and 600° C. values to θ=0 were used to determine the lattice constants of the alloy and pure Cu, respectively. These values are plotted in the FIG. 2 test of Vegard's law.

Figure 5A:
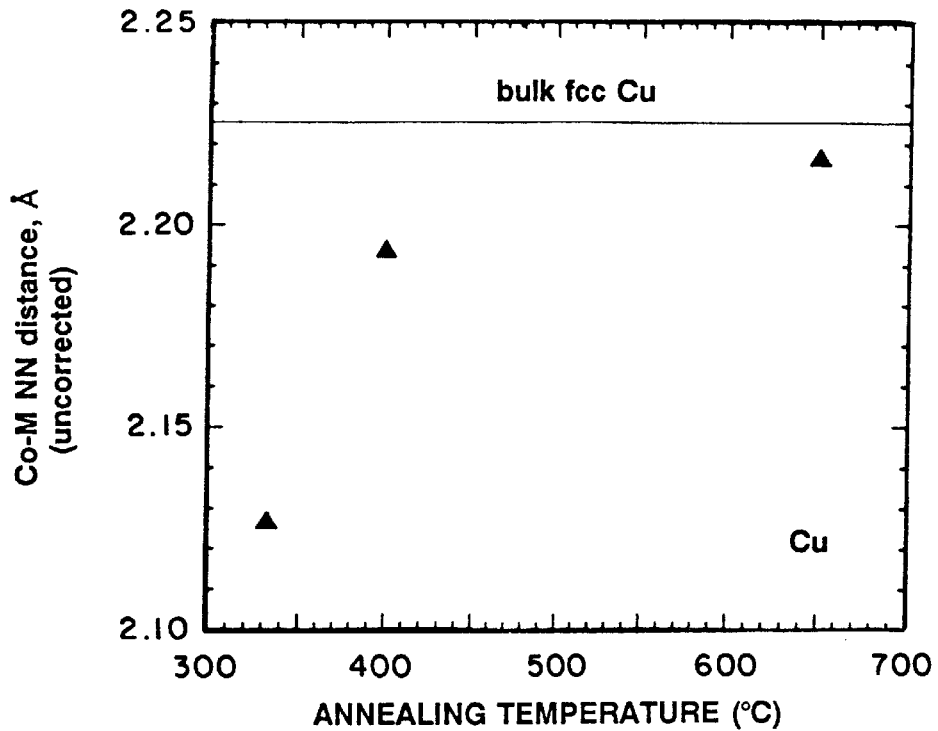
FIGS. 5($a$) and 5($b$) show the average nearest neighbor distance from Cu and Co atoms as a function of heat treatment temperature.
Figure 5B:
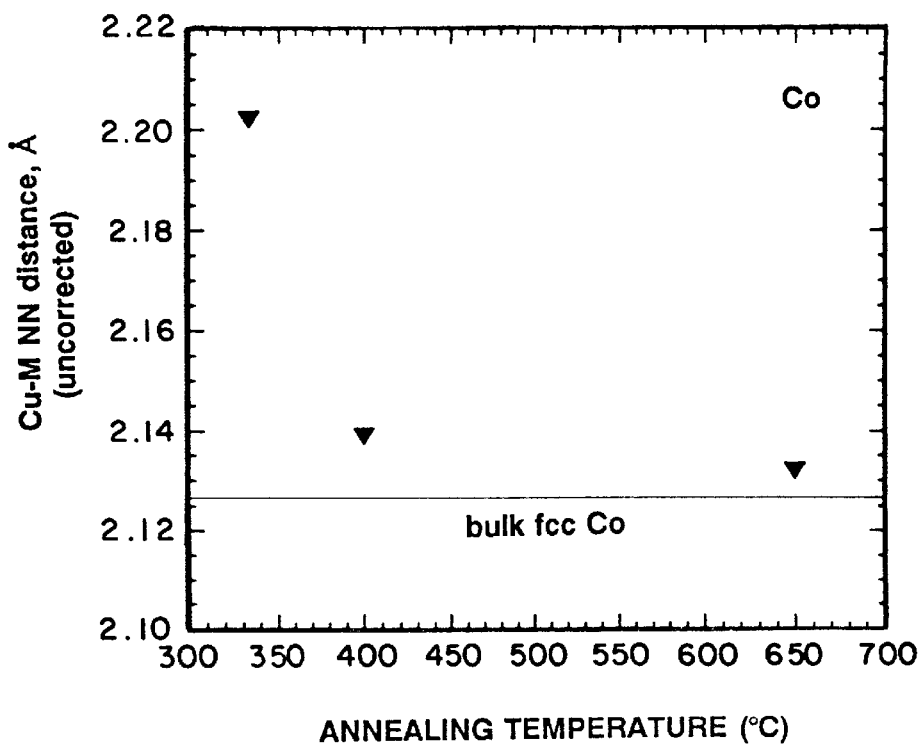

Further evidence that $Cu_{80}Co_{20}$ nanocrystalline materials heat treated at low temperatures are alloys is provided by extended x-ray absorption fine structure, EXAFS measurements. FIGS. 5(a) and 5(b) show the average nearest neighbor distance from Cu and Co atoms as a function of heat treatment temperatures. The plotted values are not corrected for electron phase shift and therefore are shifted to values lower that the expected value for an fcc structure, $a/2^{1/2}$. The average nearest neighbor distances from Cu and Co atoms are displaced in opposite directions in a sample heat treated at 333° C. from the values they have when they phase separate. This result, like the linear behavior of the lattice constant shown in FIG. 2, provides evidence of the inhomogeneous alloy structure shown in FIG. 1(c).

The microstructure of the phase separated material that results from reducing a mixed precursor is quite different from that of the isolated metal particles. As shown in FIG. 1(d), the Co phase at least partially coats the Cu or Cu-rich particles. Evidence for this structure is: (1) the Co is in an fcc structure instead of the usual hcp structure; (2) XPS measurements show that the surface of the Co is oxidized whereas the Cu surface is not oxidized; and (3) XPS measurements show that the near surface composition is Co rich, i.e., 40 at. % Co instead of the bulk stoichiometry., 25 at. %.

Figure 1E:
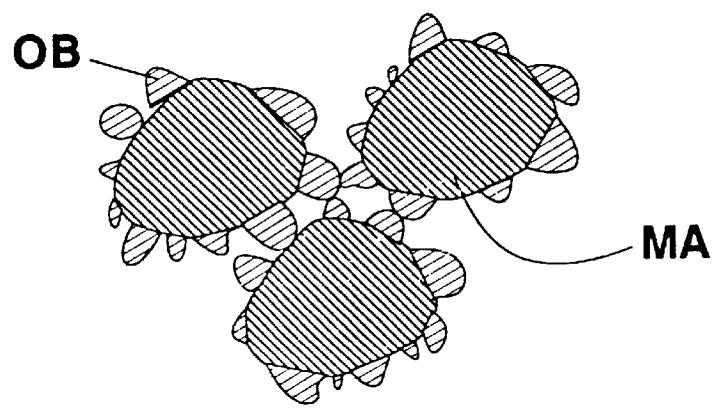

Additionally, XPS spectra show that the near-surface Co atoms oxidize before the near surface Cu atoms. Thus, as shown in FIG. 1(e), Cu metal particles coated with a Co oxide was produced. With sufficient exposure to oxygen and heat, both the Co outer coating and the Cu or Cu-enriched core are oxidized.

Obviously, many modifications and variations of the present invention are possible in light of the above teachings. It is therefore to be understood that, within the scope of the appended claims, the invention may be practiced otherwise than as specifically described.

What is claimed is:

1. A method of forming a nanostructured material of single phase nanoparticles, comprising the steps of:

forming a nanostructured, atomically-mixed precursor including oxides of a majority metal and a minority metal;

reducing said precursor to convert said oxides into said majority metal and said minority metal and form a nanostructured, single phase material, said nanostructured, single phase material comprising single phase nanoparticles, each of said nanoparticles being a single phase, supersaturated solid-state solution and including said majority metal and said minority metal;

heating said single phase, nanostructured material so as to form a single phase, nanostructured, heat-treated material including heat-treated single phase nanoparticles having a core and a coating, the atomic ratio of said minority metal to said majority metal in said coating being at least 20% greater than the atomic ratio of said minority metal to said majority metal in said precursor, said insufficient to cause said heat-treated, single phase nanoparticles to undergo phase separation;

discontinuing said heating.

2. The method of claim 1, wherein said at least two different metals are Cu and Co.

3. The method of claim 2, wherein said heat-treated single phase nanoparticles include from about 1 at. % Co to about 40 at. % Co.

4. The method of claim 1, wherein said heat-treated nanostructured single phase consists essentially of particles having a diameter of no more than about 100 nanometers.

5. The method of claim 1, wherein said precursor is formed by:

forming an aqueous solution including salts of said majority metal and said minority metal;

basifying said solution to form a nanostuctured precipitate, said nanostuctured precipitate including hydroxides of said majority and minority metals;

isolating said nanostructured precipitate from said solution;

oxidizing said nanostructured precipitate to form said nanostructured, atomnically-mixed oxide precursor.

* * * * *